Patented Dec. 30, 1947

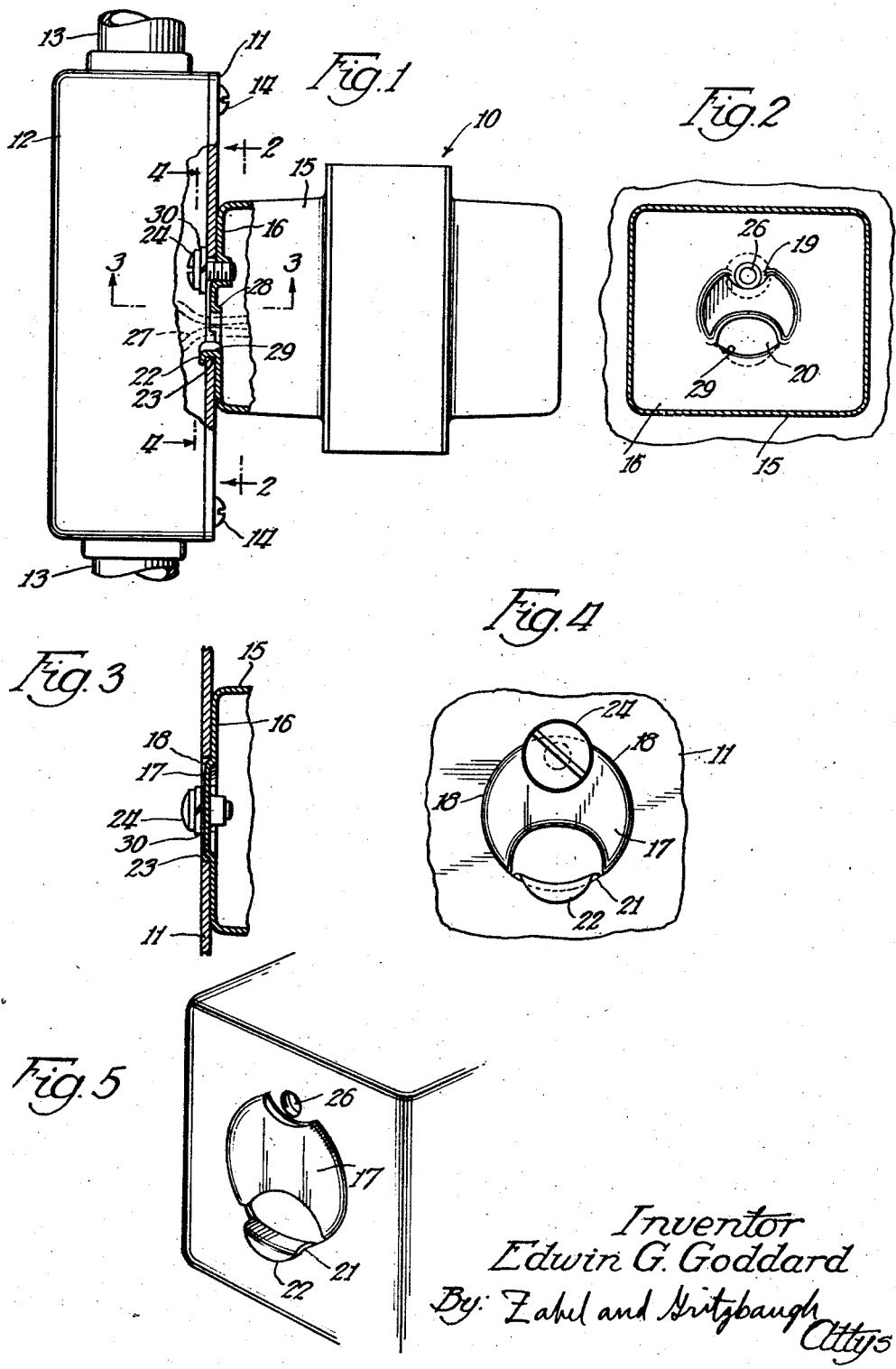

2,433,511

UNITED STATES PATENT OFFICE 2,433,511

MOUNTING MEANS FOR ELECTRICAL DEVICES

Edwin G. Goddard, Lombard, Ill., assignor to Jefferson Electric Company, Bellwood, Ill., a corporation of Illinois Application November 29, 1945, Serial No. 631,680

6 Claims. (Cl. 174—52)

This invention relates to an improved mounting means for electrical devices, and in particular, to a means by which a comparatively small electrical device may be mounted on a standard wall plate of a conduit box or the like.

It is well known that the wiring of houses and other structures is frequently disposed in conduits, and wherever there is a junction in the wiring, the branch wires are secured to the other wires in a conduit box, the conduits being secured to a wall portion of the conduit box. The wall portions, by which term is included the cover plate for the conduit box, are provided either with apertures, or with knock-out portions which can be used to form an aperture, the sizes of these apertures and knock-out portions being standard. Similarly, switch boxes, fuse boxes and other wiring equipment are provided with apertures or knock-out portions of standard size.

It is an object of this invention to provide an improved means by which a comparatively small electrical device, such as a bell ringing transformer, may be mounted in one of the apertures in a conduit box or the like.

It is a further object of this invention to provide in an electrical apparatus of the type indicated, a casing having a wall portion which is adapted to lie against the wall portion of a conduit box or the like, and which is provided with interlocking means, by means of which the conduit box and the apparatus may be secured to each other.

A still further object is to provide an improved means for supporting a small transformer on a conduit box, which supporting means provides communication between the interiors of the conduit box and the transformer so that the primary leads of the transformer may be brought into the interior of the conduit box directly. Thus the leads are entirely enclosed and concealed, and fire hazards are reduced.

Other objects, features and advantages will become apparent as the description proceeds.

With reference now to the drawings, in which like reference numerals designate like parts—

Fig. 1 shows an elevation, partly broken away, of a transformer and a conduit box embodying this invention;

Fig. 2 is a section taken along line 2—2 of Fig. 1;

Fig. 3 is a section taken along line 3—3 of Fig. 1;

Fig. 4 is a section taken along line 4—4 of Fig. 1; and

Fig. 5 is a perspective view of a portion of the transformer casing showing the improved mounting means.

With reference to Fig. 1, transformer 10 is mounted on the cover plate 11 of a conduit box 12. Conduits 13 are secured to other wall portions of the conduit box. The cover plate 11 is secured to the conduit box 12 by means of screws 14. The reference numeral 15 indicates a portion of the casing of the transformer 10, which portion provides a wall portion 16 which is disposed in contact with the cover plate 11.

The wall portion 16 is provided with a raised surface portion 17 which in this embodiment of the invention may be formed by a stamping or embossing operation, although it is obvious that the raised portion may be provided by other means, such as by spot welding a disc to the wall portion 16. The raised surface portion 17 is of generally circular outline, comforming to the shape of a circular aperture 25 in the cover plate 11. However, the edge 18 of the raised surface portion 17, which edge is adapted to abut the edge 23 of the aperture 25, is interrupted, as shown in Fig. 2. One of these interruptions to the full circular outline of the edge consists of a reentrant portion 19 in the raised surface portion 17, this reentrant portion merely providing a location for the disposition of a tapped hole 26. The second interruption in the full circular outline of the edge 18 is provided by a stamped out portion which forms an aperture 20, the stamping being bent away from the central part of the raised surface portion to form a lug 21 which projects into the conduit box 12. The lug 21 is bent downwardly to form a hook 22, which hooks over the edge 23 of the aperture 25. A screw 24 takes into the tapped bore 26, the head of the screw engaging the interior surface of the cover plate 11.

It will be seen that the transformer is securely mounted to the cover plate by means of the hook 22 and of the screw 24, and that the provision of the edge 18 which abuts the edge 23, serves to maintain the parts in such a manner that no movement between the two is permitted in a direction transverse to the axis of the screw 24. The aperture 20 provides communication between the interior of the transformer 10 and the interior of the conduit box, and through this aperture are disposed the leads 27.

During the stamping operation, the edge 28 of aperture 20 is rounded off, and this cooperates with the rounded surface 29 provided by the lug 21 to reduce the likelihood of cutting through the insulation of the leads 27. In other words, the aperture 20 is preferably extruded in two directions, so that the extrusion of edge 28 forms a bead, and the extrusion of the opposite edge forms the leg 21 and hook 22.

The hole 26 is also preferably extruded to provide greater surface for threading. A lock washer 30 is provided for screw 24 to prevent loosening of the parts.

The mounting means above described form an extremely simple and effective way of mounting a transformer on a conduit box in a manner which provides direct connection of the primary leads of the transformer to the wiring within the conduit box.

It will be noted that the slight taper of the edge 18 of the embossing provides a tolerance in fitting the parts together, facilitates the process of hooking the hook 22 over the edge 23, and permits the parts to be securely wedged into engagement.

The term "mounting plate" as used herein includes not only cover plate or wall portions of a conduit box or the like, but also a separate bracket.

Although only a preferred embodiment of this invention has been shown and described herein, it will be understood that various modifications and changes may be made in the construction shown, without departing from the spirit of the invention as defined in the appended claims.

I claim:

1. In combination, a mounting plate having a circular aperture therein, and an electrical device mounted on and having a wall portion disposed in contact with said apertured plate, said wall portion being provided with a raised surface portion projecting into said aperture and interlocking therewith, a tapped hole in said wall portion disposed within the confines of the aperture in said cover plate, and a screw threaded into said tapped hole, the head of said screw engaging that surface of said mounting plate which is opposite to the surface which is contacted by said electrical device.

2. In combination, a mounting plate having a circular aperture therein, and an electrical device having leads and mounted on and having a wall portion disposed in contact with said apertured plate, said wall portion being provided with a raised surface portion projecting into said aperture and interlocking therewith, a tapped hole in said wall portion disposed within the confines of the aperture in said cover plate, a screw threaded into said tapped hole, the head of said screw engaging that surface of said mounting plate which is opposite to the surface which is contacted by said electrical device, and an aperture provided in said wall portion which communicates with the aperture in the cover plate to provide communicating means through which the leads of said electrical device may be extended.

3. In combination, a mounting plate having an aperture therein, and an electrical device having a wall portion disposed in contact with said apertured plate, a hook formed on said wall portion which hooks over a portion of the edge of the aperture in said mounting plate, a tapped hole in said wall portion disposed within the confines of the aperture in said cover plate, and substantially oppositely disposed from said hook, a screw threaded into said tapped hole, the head of said screw engaging that surface of said mounting plate which is opposite to the surface which is contacted by said electrical device, in order that the transformer may be removably secured to said mounting plate, and a projection on said wall portion extending into said aperture and providing tapered surfaces abutting the edge thereof in wedging relationship to prevent lateral and rotational movement of said transformer with respect to said mounting plate after said screw is tightened up.

4. In a small electrical device, a casing having a deformed surface portion to provide an arc shaped shoulder extending through more than 180 degrees, a tapped hole provided in said casing within the confines of the circle partially defined by said shoulder and a screw in said tapped hole whereby said electrical device may be secured in a circular opening in the cover plate of a conduit box.

5. In a bell ringing transformer, a casing having a deformed surface portion to provide an arc shaped shoulder extending through more than 180 degrees, a tapped hole provided in said casing within the confines of the circle partially defined by said shoulder, a screw in said tapped hole whereby said transformer may be secured in a circular opening in the cover plate of a conduit box, and an opening in said casing disposed within said circle through which opening a conductor may extend.

6. In an electrical apparatus of the type described, a casing having a raised surface portion to provide an interrupted tapered edge which is substantially circular in shape, a hook projecting from one part of said edge, an extruded hole formed in said wall portion within the confines of the circle partially defined by said interrupted edge, a screw threaded into said hole, and a lock washer for said screw whereby said electrical apparatus may be secured in a circular opening in the cover plate of a conduit box, or the like.

EDWIN G. GODDARD.

REFERENCES CITED

The following references are of record in the file of this patent:

UNITED STATES PATENTS

| Number | Name | Date |
|---|---|---|
| 2,248,817 | Eiben | July 8, 1941 |
| 1,741,723 | Le Fever | Dec. 31, 1929 |